(12) United States Patent
Rothschild

(10) Patent No.: US 9,101,214 B2
(45) Date of Patent: Aug. 11, 2015

(54) INCREMENTALLY EXTENDABLE TELESCOPIC MOUNTING

(76) Inventor: Philippe Max Rothschild, Clamart (FR)

( * ) Notice: Subject to any disclaimer, the term of this patent is extended or adjusted under 35 U.S.C. 154(b) by 117 days.

(21) Appl. No.: 13/202,577

(22) PCT Filed: May 21, 2010

(86) PCT No.: PCT/IB2010/052280
§ 371 (c)(1),
(2), (4) Date: Aug. 21, 2011

(87) PCT Pub. No.: WO2010/140078
PCT Pub. Date: Dec. 9, 2010

(65) Prior Publication Data
US 2011/0303812 A1    Dec. 15, 2011

(30) Foreign Application Priority Data
Jun. 3, 2009   (FR) ...................................... 09 02672

(51) Int. Cl.
*F16M 11/00*    (2006.01)
*A47B 91/02*    (2006.01)
(52) U.S. Cl.
CPC ...................................... *A47B 91/02* (2013.01)
(58) Field of Classification Search
USPC ........ 248/188.8, 188.2, 188.3, 161, 407, 410, 248/188.1
See application file for complete search history.

(56) References Cited

U.S. PATENT DOCUMENTS

| 4,906,128 A * | 3/1990 | Trudel | 404/26 |
| 6,520,703 B1 * | 2/2003 | Narasimhan et al. | 403/29 |
| 6,524,026 B2 * | 2/2003 | Sondrup | 404/26 |
| 8,382,392 B2 * | 2/2013 | Liao | 404/26 |
| 2003/0235467 A1 * | 12/2003 | Gamson | 404/26 |

* cited by examiner

*Primary Examiner* — Amy J Sterling
(74) *Attorney, Agent, or Firm* — Jackson Patent Law Office; Jerome Jackson

(57) ABSTRACT

Incrementally extendable telescopic mounting, the extension of which is determined by a guide lug, integral with a female element and moving inside a multi-segment cam-type guide system, laid out at the periphery of a male element, and by the relative positions of a single cylindrical arc shaped stop having a trapezoid cross-section and being laid out on one of the telescopic elements, the trapezoid perimeter bearing surface of said stop resting successively on a circumferential series of staged cylindrical arc shaped hollow stops laid out on the other telescopic element and preferably having the same angular length, the same radial depth and the same trapezoid perimeter and area as those of the single stop, said single and multiple staged cylindrical arc shaped hollow stops having preferably, within their respective telescopic elements, the same outer and inner diameters and, as their common center, the device axis.

12 Claims, 7 Drawing Sheets

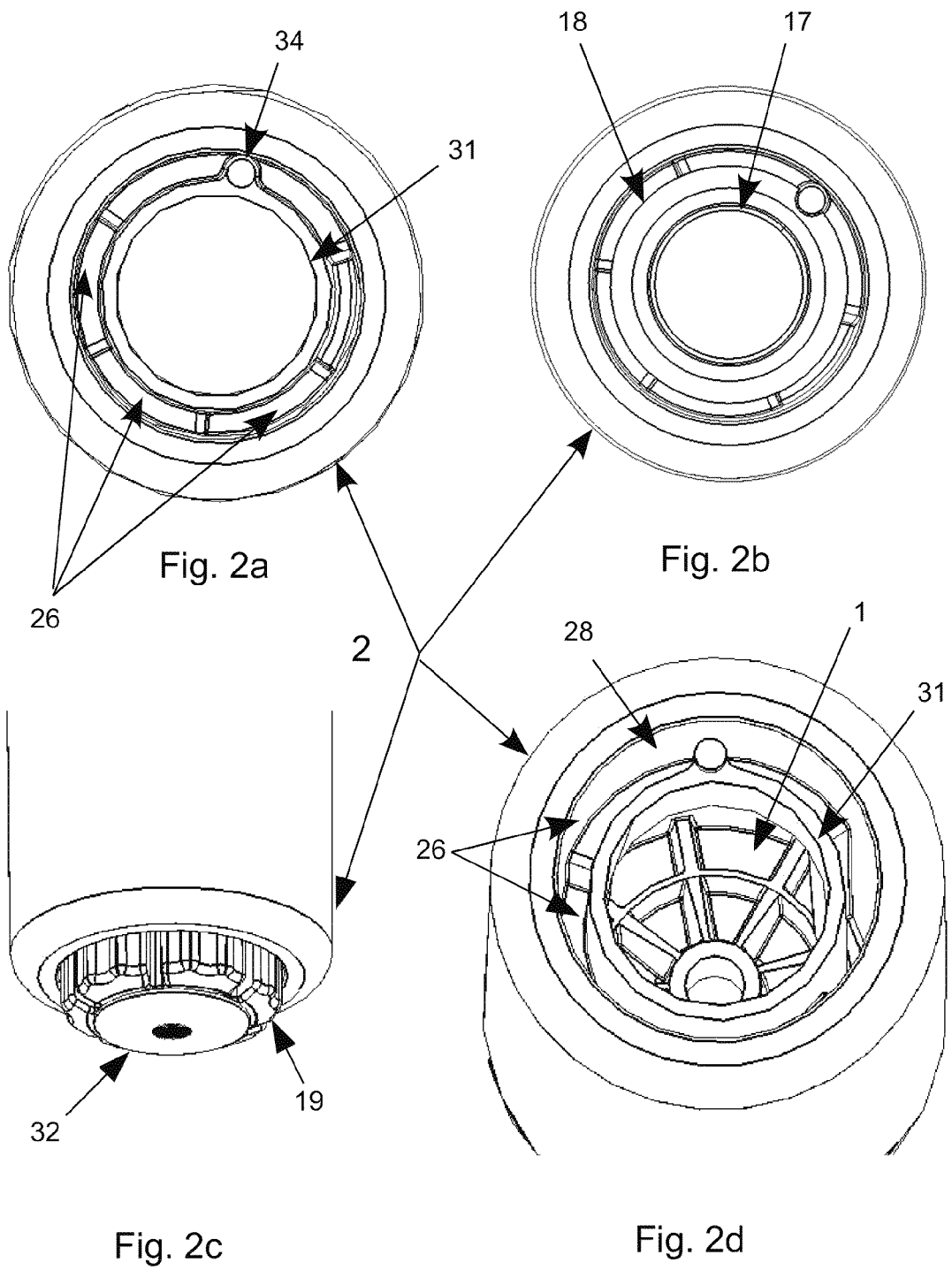

Figures 1A, 1B, 1C:
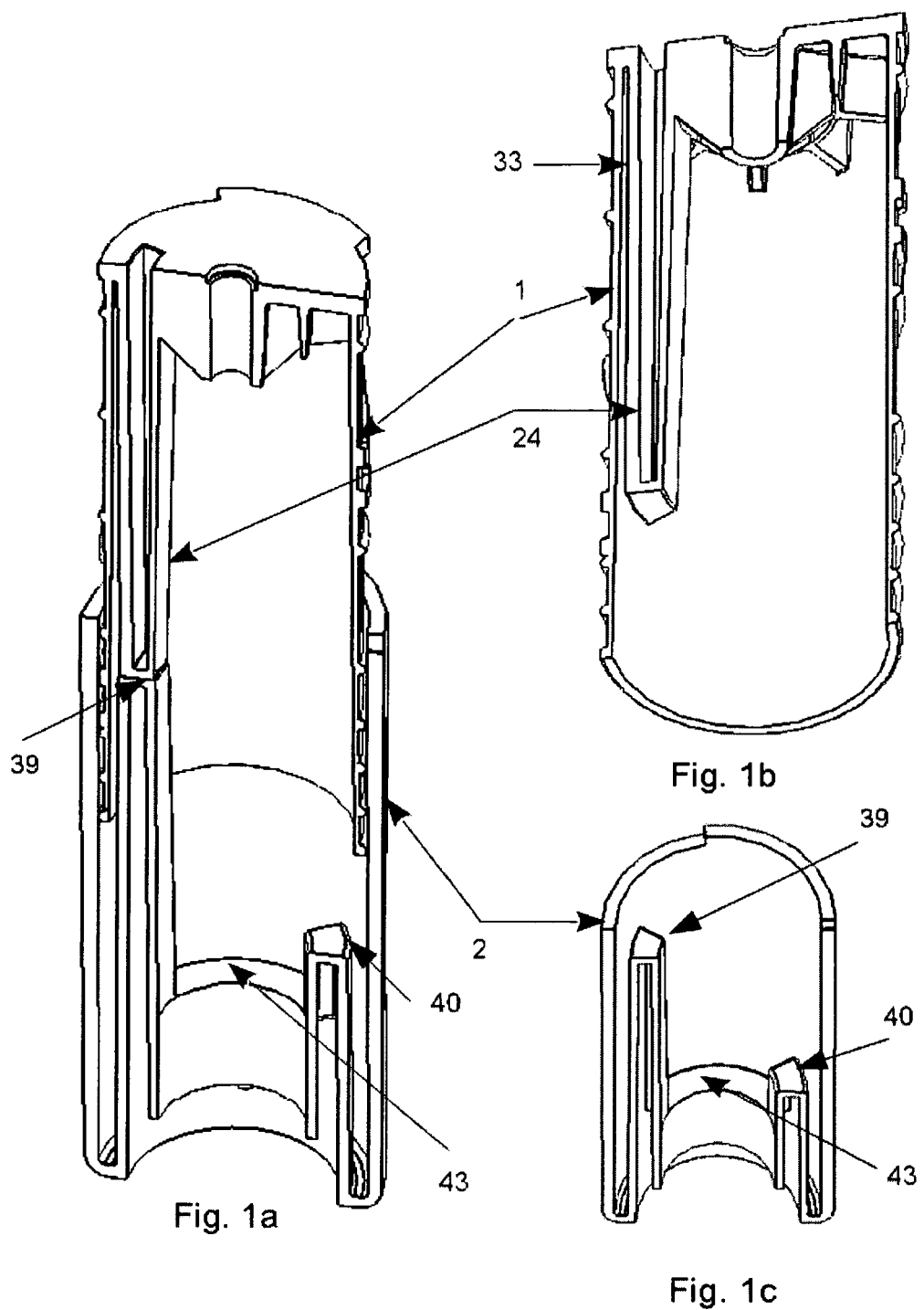

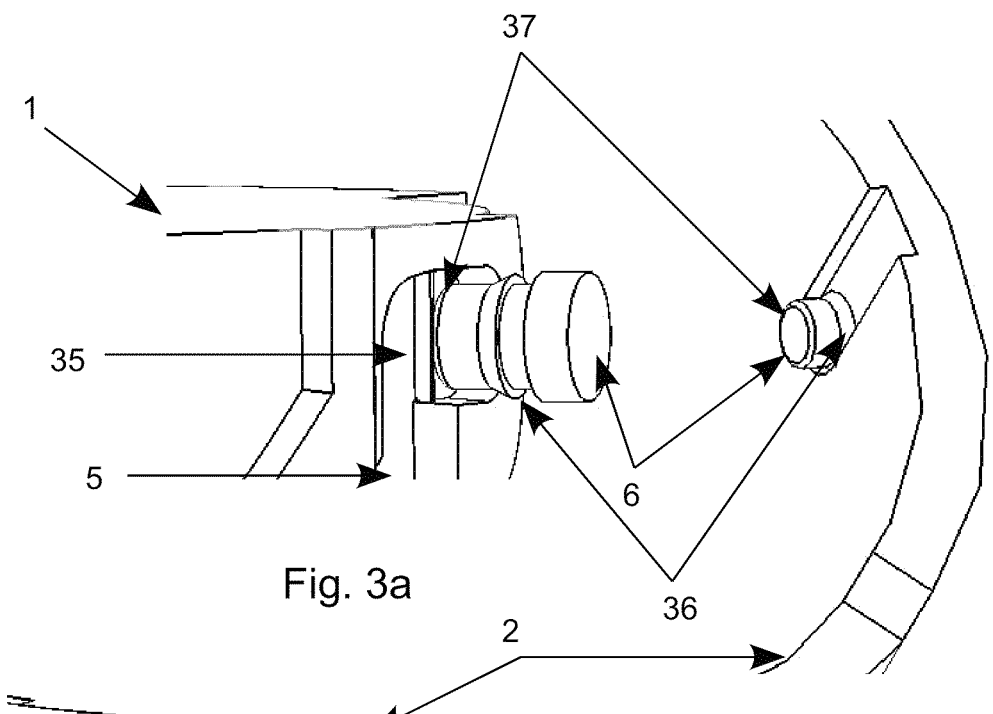
Fig. 3a
Fig. 3b
Fig. 3c
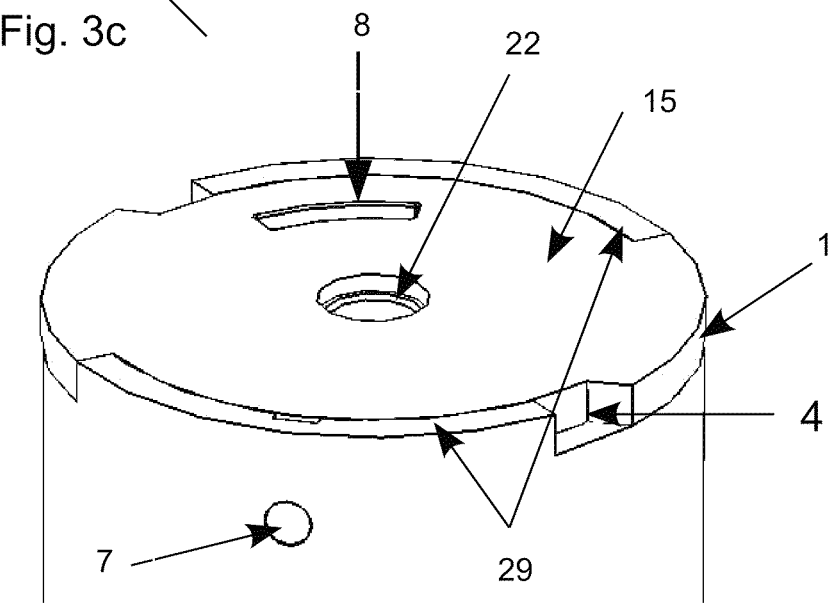
Fig. 4

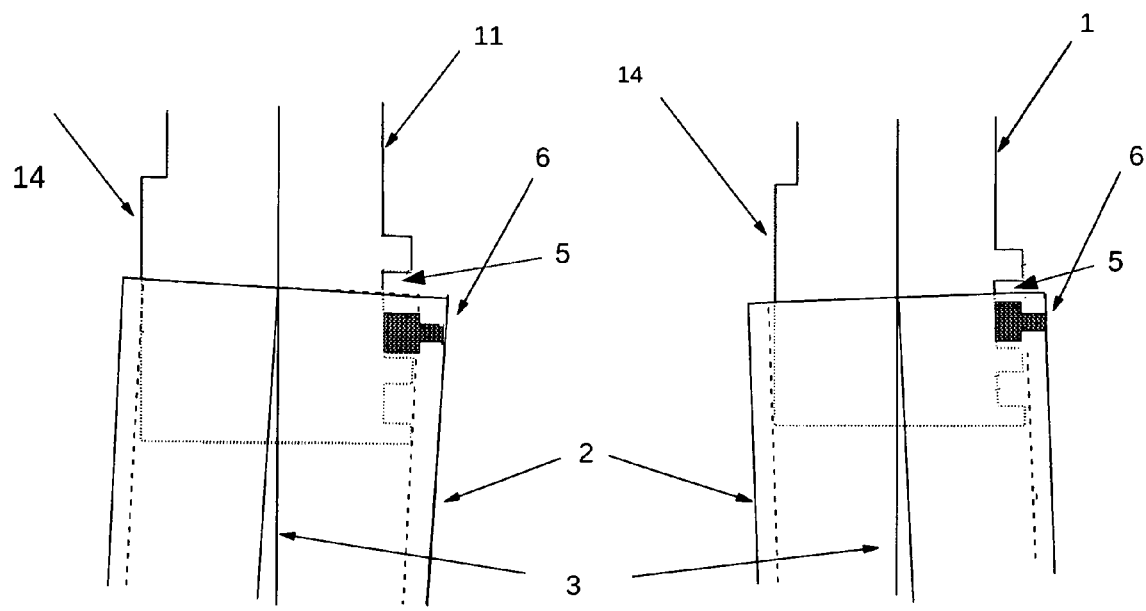
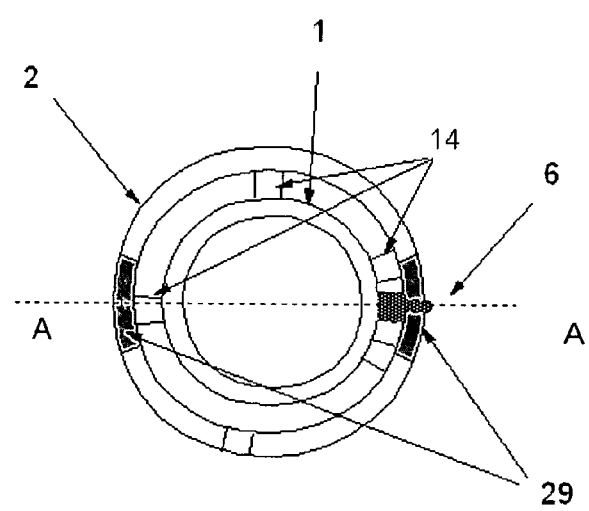
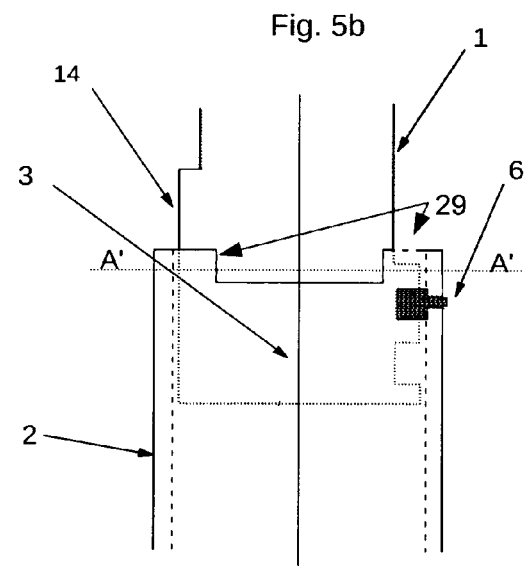
Fig. 5a
Fig. 5b
Fig. 5c
Fig. 5d

INCREMENTALLY EXTENDABLE TELESCOPIC MOUNTING

CROSS-REFERENCE TO RELATED APPLICATIONS

Prior applications were filed with the French patent office (INPI) by the same inventor, the most recent ones being application No 06 02106, on Mar. 6, 2006, and application No 09 02672 on Jun. 3, 2009 and corresponding international applications No PCT/M2007/050742, on Mar. 6, 2007, and PCT/IB2010/052280, on Mar. 6, 2007, respectively

STATEMENT REGARDING FEDERALLY SPONSORED RESEARCH OR DEVELOPMENT

Not applicable

REFERENCE TO SEQUENCE LISTING A TABLE OR A COMPUTER PROGRAM LISTING COMPACT DISC APPENDIX

Not applicable

BACKGROUND OF THE INVENTION

An incrementally extendable telescopic mounting did form the subject matter of patent application FR 2898179.

Such a telescopic support presents however various drawbacks.

The resistance of the stops to pressure is only determined by their respective cylindrical arc lengths.

The resistance of the stops to sagging is structurally ensured by the laying out of set-in cylinders onto the respective telescopic elements internal bases, the thickness of said cylinders being, moreover, limited by the injected material characteristics.

The extension range of such a support is limited by the need to provide for of enough residual overlap of its two cylindrical elements, male and female, in order to ensure the preservation of a perfect alignment between their respective axes when the close to maximum support extension is reached, viz. when the guide lug passes through the descending/ascending loop segment junctions before and after reaching the highest incremental device extension level.

This insufficient overlap between male and female elements can generate, on the one hand, frictions which are detrimental to the gravity only device extension, on the other hand, guide lug jamming, resulting from the non upright positioning of its axis, relative to the male element axis, and relative, accordingly, to the bottom of the U shaped segment cross-section, but also due to the insufficiently slanted slopes of the descending and subsequently ascending segments which the guide lug follows before and after the support reaches its maximum extension level, at which level the resistance to downward pressure is ensured by a single couple of mating stops having a slightly greater stop length.

Because of their positioning at the stop cylinder upper end, said mating stops are moreover prone to sagging.

Finally, considering the present state of the art, for a telescopic support according to prior art and designed with more than one high level, the cumulative resting, on top of each other, of all the mating stops cannot be guaranteed.

BRIEF SUMMARY OF THE INVENTION

The telescopic device according to the invention overcomes these various drawbacks and hazards.

It provides for the resting of a single arc shaped stop, laid out on one of the telescopic elements, upon the staged cylindrical stops laid out on the other telescopic element.

It provides for resorting to cylindrical arcs defining hollow stop structures which are integrated within their respective telescopic elements. Thus, for a device having a given initial height and diameter, given that larger supporting surfaces can be provided for on hollow stops, there is the possibility of providing for a larger number of load bearing positions. Moreover, such a device avoids the drawbacks of resorting to mixed, decreasing resistance solutions, consisting, for low-level bearing/supporting stops, in adding up small resistances of several limited length cylindrical arc stops, while providing, at the maximum device extension level, for the bearing upon a single large length cylindrical arc stop.

It further provides for the use of a vertical, projecting arc element, which partially extends, in an upward direction, the cylindrical wall of the female telescopic element, at its open end, such projecting arc element being laid out in a circumferential position astride the plane traversing both the female telescopic element axis and the circumferential position of the guide lug housing axis, in order to increase the lever arm effect of the lever arm connecting the guide lug to the edge of the projecting arc element, which, by resting upon the male element ribs ensures the conservation of the alignment of the two telescopic element axes, whenever, under the influence of its weight, the female telescopic element axis tends to move away from the male telescopic element axis.

It allows at the same time for this vertical, projecting element, to mesh with a mating horizontal slot, laid out at the periphery of the upper telescopic element cap end, which acts as a prop for the piece of equipment to be supported The telescopic device according to the invention provides also for the use of additional mobile contact surfaces between the female and male elements, in order to temporarily lengthen the male element and thus to increase the overlap between the two telescopic elements, before and after the female element reaches its maximum extension level.

For a given initial height and diameter of a telescopic device according to the invention, the presented embodiment, based on the use, on the female telescopic element, of a circumferential series of hollow stop cylindrical arcs having a circular seat surface and, on the male element, of a single cylindrical arc stop having a trapezoid section and slanting walls with roughly the same thickness, detached from the male telescopic element inside wall and having a seat surface, on the inner cap end surface provided for at the male telescopic element upper end, in the shape of a cylindrical arc, allows for obtaining a high and uniform resistance to vertical pressure, at all extension levels of the telescopic support, before and after locking into position.

Thanks to the increased axial depth of the circumferential series of hollow stop cylindrical arcs, the centring of the upper telescopic element vertical thrust on the lower telescopic element, in comparison with what was achieved in prior art devices, ensures a better lateral stability of the device and avoids misalignments of the telescopic elements. Such a lay-out also increases the mechanical resistance to vertical thrust exerted upon the device.

Thanks to the statics chosen for the laying out of the hollow stops, the device according to the invention can be used in dual-mode, with or without jackscrew, the weight of the supported piece of equipment resting, in the first case, singly upon the inside cylindrical stop wall, whereas in the second case, it rests singly upon the outside cylindrical wall of the circumferential series of hollow stop cylindrical arcs.

The dual-mode use of the device according to the invention, either with or without jackscrew allows for the increase of the extension range which can be obtained with one and the same incremental extension device.

To meet an aesthetic concern, the jackscrew head may preferably and partially be nested within a cylindrical cavity laid out at the bottom of the lower telescopic element, said cavity perimeter being delineated by the outside cylindrical wall of the circumferential series of hollow stops. Notches on its periphery, accessible when the jackscrew head interlocking is complete, allow for the fine adjustment of the device after having made the choice of one of the predefined device heights, viz. extension range gains beyond those provided for by the incremental extension.

On the contrary, the jackscrew extraction allows for the lowering of the minimal height of the device, insofar as the U shaped laying out of the telescopic element lower end, rounded towards the outside and in contact with the floor, allows for the preservation of the possibility of slanting the device, and thus, the piece of equipment which it supports, e.g. a box-spring or bed frame.

Two projecting cylindrical arc elements, preferably laid out at the open end of the female telescopic element, and two mating cylindrical, horizontal slots, laid out at the periphery of the male element and, in addition, the guide lug position being chosen so as to guarantee a sufficient lever arm length, said lever arm being made up of the distance, guide lug/upper edge of one of the projecting arc elements, ensure the preservation of the alignment of the male and female telescopic element axes, at the device extension levels close to the maximum, so as to maximize the device extension range. The arcs described by the projecting horizontal cylindrical elements on the male part, are sized so that their lengths are shorter than that of the arcs described by the vertical cylindrical slots provided for at the upper end of the female element cylindrical wall, by a length at least equal to that of the arc described by the guide lug within the horizontal locking segment of the cam-type guiding system, laid out at the male element periphery, so as to provide for its locking in the absence of any extension. According to whether this/these rotation gaps/spaces is/are on the right of the projecting cylindrical arc elements on the male telescopic element, or on its right, the device is, in a visible fashion, locked or unlocked, respectively.

To make up for the reduced thickness of the female element wall, the shape of the guide lug ensures its axial stability within its housing, avoids the risk of wrenching when resting upon the segment upper edge, facilitates its mounting from the outside, the elasticity of its material enabling it, in addition, to penetrate the cam-type guiding system through the junction segment, and the horizontal locking segments, in order to stay locked within said segments.

LISTING OF ALL FIGURES BY NUMBER

Figure 6A:
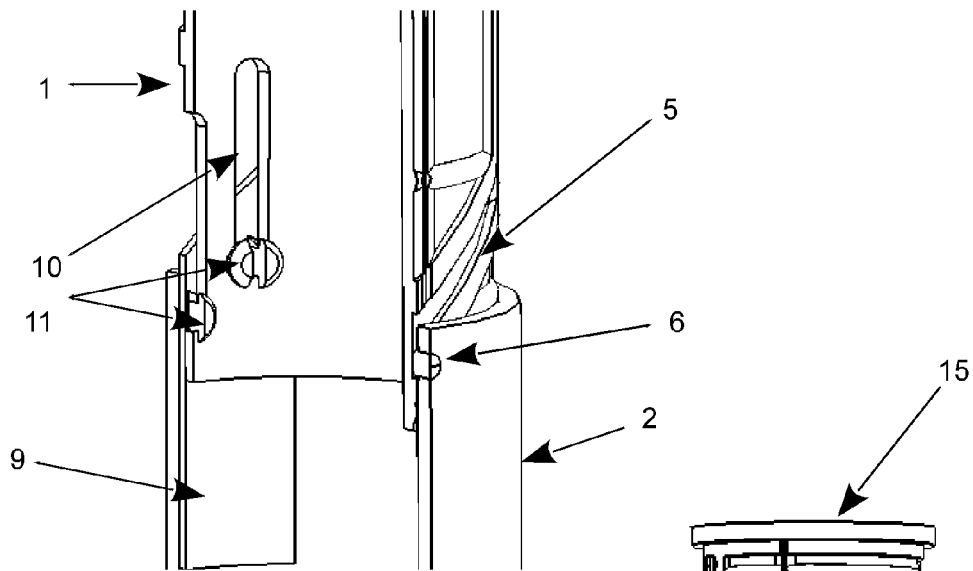
Figure 6B:
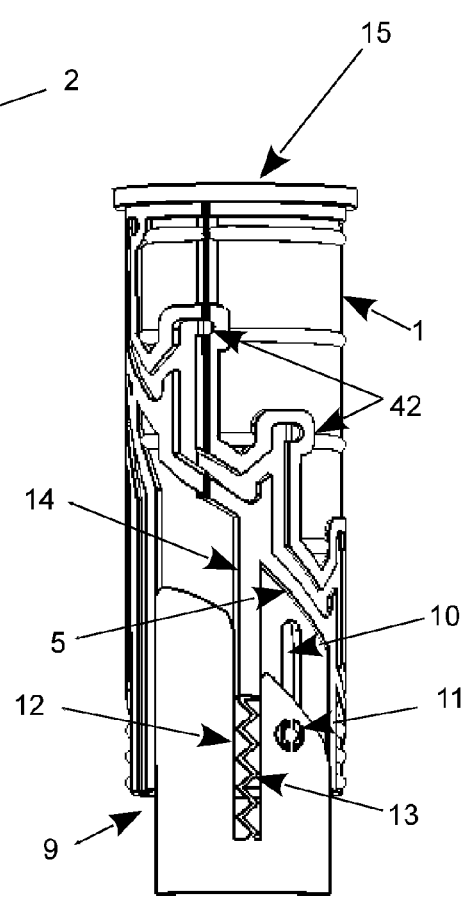

By way of illustration, drawings are enclosed, which represent such a telescopic supporting device, in a non-limited fashion:

FIGS. 1a, 1b and 1c: 3D, cutaway ¾ views of the two telescoping elements, one in respect of the other, FIGS. 1d and 1e: a 3D top-down ¾ view and a plan view of a female telescopic element seen from above, FIGS. 1f and 1g: a 3D top-down ¾ inside view and a 3D outside lateral view of a male telescopic element, FIGS. 2a and 2b: plan views of the female telescopic element as seen from below and showing the internally threaded adapter sleeve (17); 2c: 3D ¾ view of the bottom part of the female telescopic element with the head of inserted adjustment screw; 2d: 3D ¾ view of the female telescopic element as seen from below, without the internally threaded adapter sleeve (17), FIG. 3a: 3D view of the guide lug, inserted within a cam-type segment (5); FIG. 3b: view of the guide lug projecting of the inside female telescopic wall; FIG. 3c: 3D outside view of the guide lug housing (7) on the female telescopic element, FIG. 4: 3D ¾ view of the upper part of an incrementally extendable telescopic mounting in a compact state, FIGS. 5a and 5b: lateral plan views of the bottom part of a male telescopic element (1) nested within the upper part of a female telescopic element (2) prior to adding two projecting cylindrical arc elements (29), partially extending, at its open end, the cylindrical female telescopic element;

FIGS. 5c and 5d: cross-section of and lateral plan view of the bottom part of a male telescopic element (1) nested within the upper part of a female telescopic element (2) after adding two projecting cylindrical arc elements (29) partially extending, at its open end, the cylindrical female telescopic element;

FIG. 6a: cutaway view of the bottom part of a male telescopic element (1) and the upper part of a female telescopic element (2) depicting from within the device, the mobile, sliding, cylindrical arc shaped spacer (9);

FIG. 6b: 3D lateral view of the male telescopic element (1) showing the mobile, sliding, cylindrical arc shaped spacer (9), with a spring under compression, forming a planar zigzag (12) cast in one piece with the open housing (13) and resting, at its upper end, on the ending of the vertical rib (14).

FIG. 1a represents a 3D cutaway cross-sectional vertical ¾ view from above, representing the two telescopic elements (1 and 2) of the device at the time the trapezoid bearing surface of the single, cylindrical and vertical, trapezoid section arc stop (24), rests on the trapezoid surface of the highest level hollow supporting stop of the circumferential series of cylindrical arcs (26), said cylindrical arcs being an integral part of the lower telescopic element (2).

FIG. 1b represents a 3D cross-sectional vertical ¾ view from below, blown-up in comparison with that of FIG. 1a of the male telescopic element (1), which shows the single cylindrical arc stop (24), said arc having a trapezoid section and a radially outside wall (33) detached from the male telescopic element (1) inside wall.

FIG. 1c represents a 3D cross-sectional ¾ view from above, of the female telescopic element (2), reduced in height as compared with that of FIG. 1a and which shows, from left to right, a) the tip of the supporting surface of the cylindrical arc stop corresponding to the highest device extension level; b) the supporting surface of the cylindrical arc stop on which the single cylindrical arc stop rests in the absence of any extension; c) the tip of the supporting surface of the cylindrical arc stop corresponding to the first extension level.

Figure 1D:
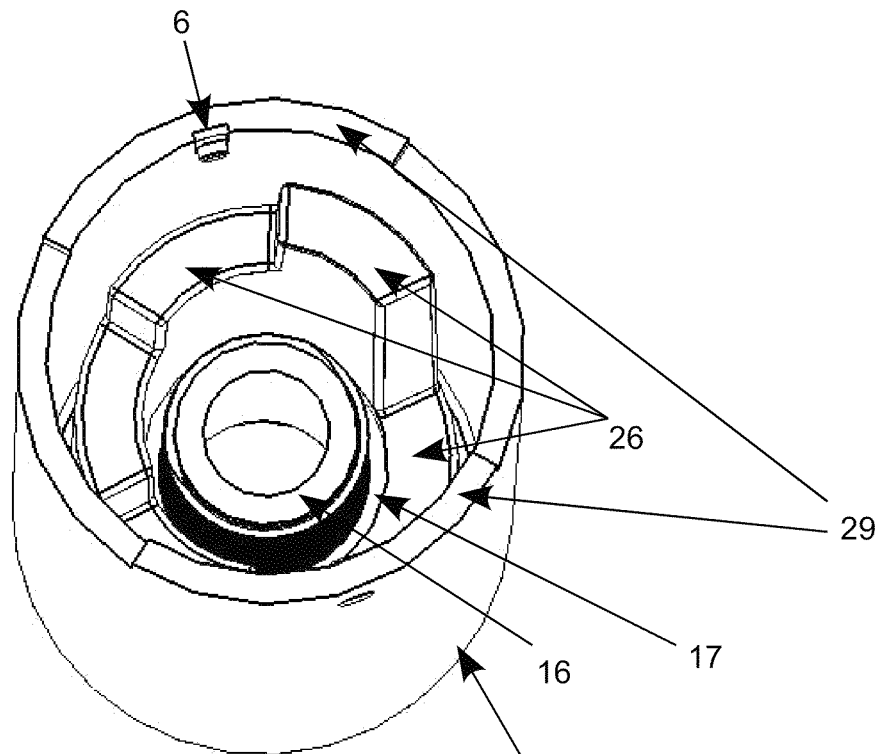

FIG. 1d represents a 3D inside and outside ¾ view of a female, lower telescopic element (2), incorporating a circumferential series of cylindrical arcs which define a staged hollow stop structure (26), the high levels of said hollow stops having a uniform angular length and radial depth, an internally threaded jack screw adapter sleeve (17), a screwed-in hollow jack screw (16), two projecting cylindrical arc elements (29), on the outside edge of the female telescopic element (2), the guide lug (6).

Figure 1E:
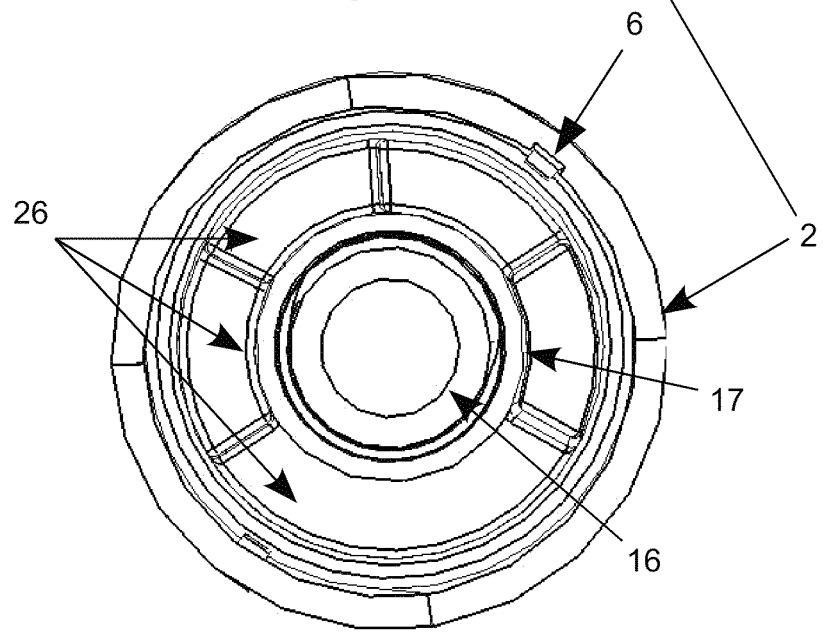

FIG. 1e represents, on a top-down, internal view of a female, lower telescopic element (2), the circumferential series of cylindrical arcs which define a hollow stop structure (26), the four high levels of which present uniform supporting surfaces, the jackscrew body shoulder (17), the hollow jackscrew (16), the guide lug (6).

Figures 1F, 1G:
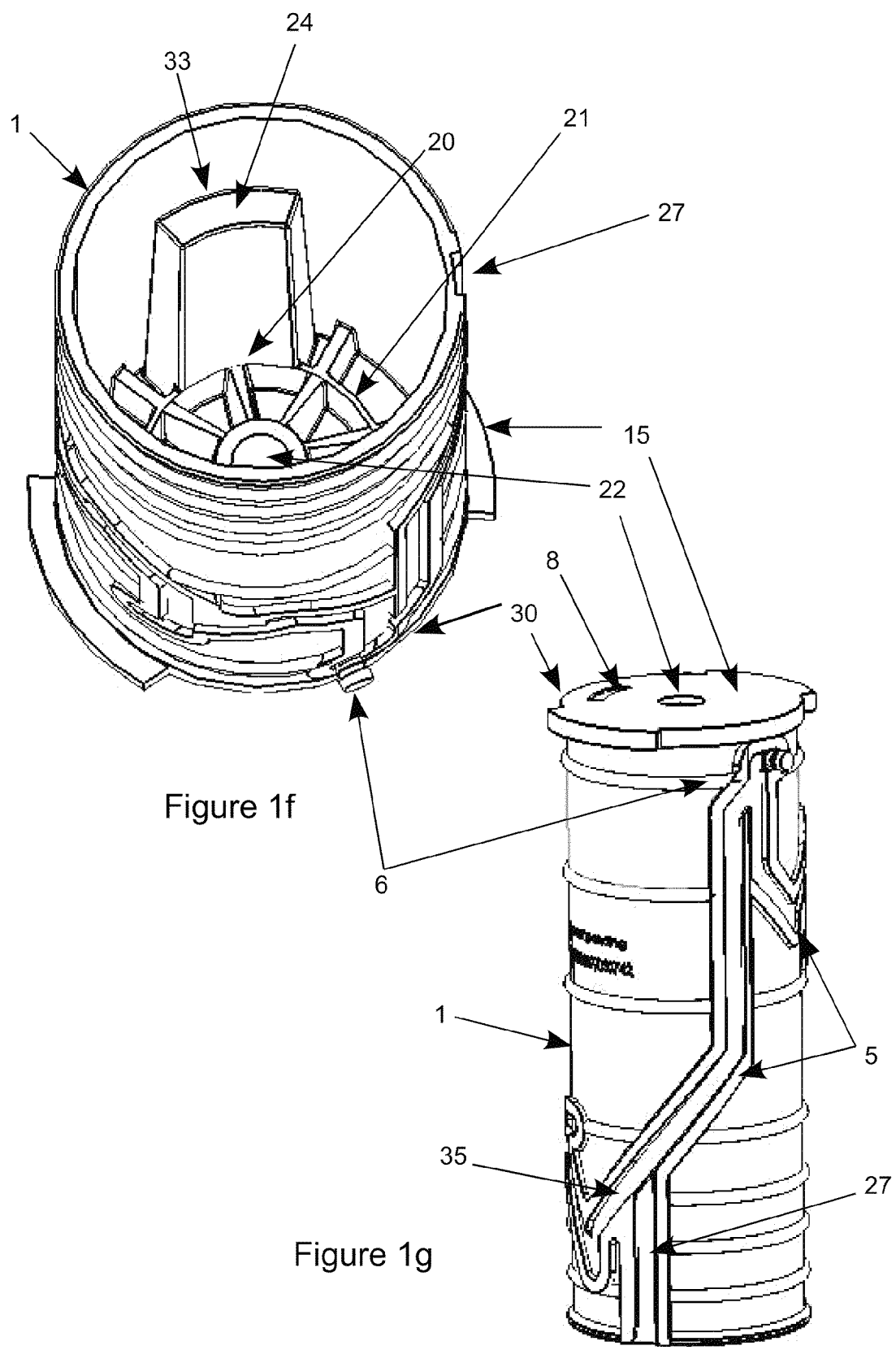

FIG. 1*f* represents a 3D inside/outside ¾ view of an upper male telescopic element (1), in an upside down position, incorporating a single cylindrical arc having vertical and horizontal trapezoid sections which define a hollow stop structure (24), the radially external wall (33) of which, relative to the vertical device axis, faces the inside cylindrical wall of the male telescopic element (1) and the seat perimeter (20) of which, on the surface defining internally the cap end of said telescopic element, has a larger surface in comparison with that, at its other end, of the trapezoid perimeter of its bearing surface resting on the circumferential series of cylindrical arcs defining a hollow stop structure on the female telescopic element. Also shown are consolidation ribs (21) of the housing (22) of a threaded rod attachment meant to be laid out at the centre of the external surface of said telescopic element cap end (15), a horizontal slot (30).

FIG. 1*g* represents an outside 3D view of the upper male telescopic (1) element, its guide lug (6), its cam-type guiding system (5), the junction segment (27), the vertical guide lug (6) movement blocking rib (35) which delineates, on its upper side, the cam-type guiding system (5), the emerging opening (8) formed on the male telescopic element cap end external surface (15) and corresponding to the hollow cylindrical arc orifice, said hollow arc defining a single hollow stop structure, two horizontal slots (30) forming circle arcs, the respective centres of which are preferably inscribed within one and the same plane traversing the vertical device axis.

FIG. 2*a* represents a sectional view from below of a lower telescopic element (2) according to the open internal cylindrical element (31) axis of the circumferential cylindrical arc series, defining a hollow stop structure (26) and, at its periphery, a locating notch (34).

FIG. 2*b* represents a sectional view from below of a lower telescopic element (2) according to the threaded part of a jackscrew body (17), said threaded part being inserted into the internal cylinder of the circumferential series of cylindrical arcs defining a hollow stop structure (26), and of its shoulder (18) comprising a notch, wherein the locating notch (34), rigidly connected to the circumferential cylindrical arc series (26) internal cylinder is engaged.

FIG. 2*c* represents on a 3D ¾ view from below of a lower telescopic element (2), a jackscrew head (19), fitted up with a convex bearing surface (32) and partially inserted into the cavity accommodated below the circumferential cylindrical arc series defining a hollow stop structure.

FIG. 2*d* represents on a 3D ¾ view from below of a lower telescopic element (2), cylindrical arcs defining a hollow stop structure (26), the outside cylindrical wall (28) extending the jackscrew head housing cylindrical wall, as well as, on the inside, a view of the bottom inner part of the male element (1).

FIGS. 3*a*, *b* and *c* represent, successively, 3D views of a guide lug (6), shown isolated in FIG. 3*a*, resting on the bottom surface of a laterally guide lug (6) locking segment of the cam-type guiding system (5) laid out on a male telescopic element (1), comprising, from its device inside end toward its outside end, respectively: a chamfered tip (37) which facilitates the clearing of the laterally locking ribs (35), a guide lug (6), a position keeping tapered shoulder (36), after said lug traverses a constricted opening (38) (FIG. 3*c*) fitted out within its housing (7) in the female telescopic element wall (2) (FIG. 3*b*).

FIG. 4 represents, at the male telescopic element (1) upper end, the outside surface of its cap end (15) whereupon rotation spaces (4) are formed, providing for the locking of the female telescopic element (2) onto the male telescopic element (1) when the device is in a compact state, the guide lug housing (7), the housing (22) provided for the introduction of a device attachment dowel, linking the device to the piece of equipment to be supported, and the height extension of projecting cylindrical arc elements (29) of the female telescopic element (2).

FIG. 5*a* represents a plan view of the bottom part of a male telescopic element (1) nested within the upper part of a female telescopic element (2), the intersection of the plane determined by the top end opening of the female element with the male element cylindrical wall, at a point, diametrically opposed to the guide lug (6) position on the female element, viz. at a level which is higher than its intersection with the plane passing at the guide lug (6) vertical, when said lug finds itself at a veering point of a descending/ascending cam-type segment of the guide lug (6) controlled guiding system (5) laid out on the periphery of the male element (1).

FIG. 5*b* represents a plan view of the bottom part of a male telescopic element (1) nested within the upper part of a female telescopic element (2), the intersection of the plane determined by the top end opening of the female element with the male element cylindrical wall, at a point, diametrically opposed to the guide lug (6) position on the female element, viz. at a level which is lower than its intersection with the plane passing at the vertical of the guide lug (6) when said lug is at a veering point of a descending/ascending segment of the cam-type guiding system (5) laid out on the periphery of the male element (1), illustrating a skew element positioning through the marked angle (3) between said elements.

FIG. 5*c* represents a cross-sectional view according to line A-A of the male and female elements of the telescopic device, the male element bottom part (1) nested within the top part of a female element (2), said female element (2) comprising vertical, projecting, wall raising cylindrical arc elements (29), the centres of which are inscribed in the A-A plane traversing, on the one hand, the female element (2) axis and, on the other hand, the circumferential position of the guide lug (6) housing centre, and which rest upon ribs (14) projecting from the male element (1).

FIG. 5*d* represents a plan view of the male element (1) bottom part nested within the top part of the female element (2), the line A'-A' crossing, at their centres, the vertical, projecting, female element wall raising cylindrical arc elements (29) which rest on the male element ribs (14), the respective axes (3) of the male (1) and female (2) elements coinciding.

FIG. 6*a* represents a cutaway view of the lower and upper, female (2) and male (1), nested elements, respectively, between which appear, the mobile, sliding, cylindrical arc shaped spacer (9) in its maximum lowering position, two oblong holes (10) on the male part (1), each one being traversed by an attachment (11).

FIG. 6*b* represents a frontal, 3D, outside view of the male element (1), "extended" over part of its circumference, the mobile, sliding, cylindrical arc shaped spacer (9) having traveled downwards over the maximum possible distance and the clipsed, retaining element (11) having reached the lower limit of its travel within an oblong hole (10), the spring (13) forming a planar zigzag, connecting, at its lower end, to the mobile, sliding, cylindrical arc shaped spacer and expanding/compressing itself in a surface line oriented housing (12) laid out in the upper part of the mobile, sliding, cylindrical arc shaped spacer, sliding along the vertical rib (14), projecting from the male element, the spring (13) resting upon the lower end of the vertical rib (14).

DETAILED DESCRIPTION OF THE INVENTION

According to a first characteristic of the invention, the incrementally extendable telescopic mounting, the successive incremental extensions of which are obtained, at the different levels, by having matching vertical stops, projecting from the internal, axial, cap end surfaces of the two telescopic elements making up the device, in contact, either with the supported piece of equipment/furniture, or with the surface upon which the device rests, the choice of supporting surface being determined by the position of a guide lug, rigidly connected to one of the telescopic elements, displaceable in rotation, and cooperating with a set of segments followed by said guide lug, which build up a peripherally laid out closed loop on the other telescopic element, the choice of a staged stop of a given height, resulting from successive raising and lowering movements of the upper telescopic element, is fitted with bearing/supporting stops, laid out on the two telescopic elements, made up of cylindrical arcs defining hollow stop structures having as their centre, the common axis of their respective telescopic elements, namely, on the one hand, a single cylindrical arc stop, on one of them, having a vertical trapezoid section, its slanting, radially outside wall being cleared from the telescopic element internal cylindrical wall and its four slanting walls forming an emerging opening in the upper flat surface of the upper telescopic element cap end, the dimensions of its seat surface perimeter on the lower flat surface of said upper telescopic element cap end being larger than those, at its other end, of the trapezoid perimeter of its bearing surface and, namely, on the other hand, on the other telescopic element, a circumferential series of staged cylindrical arc stops having a hollow cylindrical, circular, common seat surface, the outside wall of the lower telescopic element extending internally to the outside wall of the circumferential series of cylindrical arcs, the annular junction of the lower ends of said walls defining, directly or indirectly, the device's bearing surface area on the floor and having preferably an asymmetrical U shape.

According to another characteristic of the invention, the lower end of the lower telescopic element, incorporates, at its centre, an opening having the same diameter as the one pertaining to the circumferential series of staged cylindrical arc stops and in that, said opening receives an internally threaded cylindrical body, preferably endowed, at its periphery, with a locking system, e.g. by a snug, a fine adjustment jackscrew being screwed into said threaded cylindrical body, said jackscrew being endowed with a head, the end part of which, in contact with the floor, being convex and preferably fitted out with adjustment notches.

According to another characteristic of the invention, the distance separating the inside wall of the telescopic element containing the circumferential series of staged cylindrical arc stops from the radially outside wall of same is greater than that obtained by adding the other telescopic element cylindrical wall thickness and the height of the ribs making up the cam-type segment system that defines the guide lug path laid-out on the surface of said other telescopic element, the preferred distance being the one whereby the radially outside wall of the circumferential series of staged cylindrical arc stops is vertically in line with the radially outside wall of the single cylindrical arc shaped stop bearing upon any of the staged cylindrical arc stops.

According to another characteristic of the invention, the guide lug can be clipsed onto the receiving telescopic element and incorporates, lengthwise, four parts, one, chamfered at its internal end and having a length equivalent to the depth of the ribs delineating the cam-type guiding system laid out on the surface of one of the telescopic elements, a second one, slightly tapered, the outer end of which rests upon the female element inside wall after its crossing of a constricted opening, lodged, both axially and lengthwise, in the guide lug housing provided on the female element, the third part being lodged inside the constricted housing opening, and the fourth part having an extended, stop-collar diameter, and resting, at the housing outer end, on the cylindrical guide lug housing walls.

According to another characteristic of the invention, at least one vertically projecting arc element, extending, at its open end, the cylindrical female telescopic element wall and providing an additional contact surface between the two telescopic elements, the projecting arc element height being equal to the thickness of the male telescopic element top mounting plate upon which the supported piece of equipment rests, meshes with at least one horizontal slot laid out on the periphery of said male telescopic element, and in that the projecting vertical arc element has a circumferential position sitting astride the plane traversing both the female telescopic element axis and the circumferential position of the guide lug housing.

According to another characteristic of the invention, at least one rotation space for at least one horizontal arc element projecting from, and peripheral to, the male telescopic element cap end, is lodged in the empty vertical slot at the top end of the female telescopic element wall, in order to provide, by rotation of one of the telescopic elements relative to the other, for the locking of the device in a compact state.

According to another characteristic of the invention, an additional contact surface is provided, that is made up of a mobile cylindrical arc, fastened in a sliding manner to the upper telescopic element, so as to create a partial or circular temporary extension of the upper telescopic element, resting totally or partially upon the inside wall of the other telescopic element, during the device extension/compression cycle.

According to another characteristic of the invention, the mobile, sliding, cylindrical arc shaped extension element has the same centre as, and a radius that is intermediate to those of, the male and female element cylinders, has a thickness equal to that of the rib relief defining the cam-type guiding system, laid out on the periphery of one of the telescopic elements, so as to slide vertically between the external surface of the male telescopic element and the inside wall of the female telescopic element and in that it is kept attached to the male element cylinder.

According to another characteristic of the invention, the mobile, sliding, cylindrical arc shaped extension element travel length is determined, on the one hand, by the shortest length of at least one oblong hole laid out on the male telescopic element and, on the other hand, by the travel of a projecting element, attached to, and perpendicular to, the male telescopic element axis, which, by sliding within the oblong hole, ensures the mobile junction, by an attachment, for instance by clipsing, between the male telescopic element and the sliding, cylindrical arc shaped extension element, internal, the one and the other, to the female telescopic element.

According to a last characteristic of the invention, the sliding, cylindrical arc shaped extension element incorporates, on its upper part, a generatrix oriented housing, the upper ending of which slides along a vertical guiding rib projecting from the male part, and in that a spring under compression, forming a planar zigzag connected with the open housing bottom end, e.g. cast in one piece with said open housing bottom end, rests, at its upper end, on the ending of the vertical rib.

The invention claimed is:
1. An incrementally extendable telescopic mounting comprising:
   a first cylindrical part defining a longitudinal axis and including a first end part defining a circle,
a first cylindrical wall,
a first stop projecting from the first end part in a direction parallel to the longitudinal axis,
the first stop defining a bearing surface there being a clearance between
the first stop and the first cylindrical wall; and
a second cylindrical part including
a second end part,
a second cylindrical wall,
a second stop projecting from the second end part in a direction parallel to the longitudinal axis,
the second cylindrical part being coaxially arranged with the first cylindrical part such that the second cylindrical wall fits into the clearance, wherein
one of the first and second cylindrical parts defines a groove displaced from the first stop, the groove defining an incline that is non-parallel to the circle, and non-parallel to the longitudinal axis, a distance between a point, on the groove, and the circle varying with an angular displacement of the point about the longitudinal axis, and
the other one of the first and second cylindrical parts includes a guide lug displaceable in the groove, whereby the second stop is positioned to selectively abut the bearing surface of the first stop.

2. An incrementally extendable telescopic mounting according to claim 1 wherein the first cylindrical part is configured to engage a jackscrew.

3. An incrementally extendable telescopic mounting according to claim 1 wherein a distance separating an inside wall of the first cylindrical part from an outside wall of first cylindrical part is greater than a thickness of the second cylindrical part.

4. An incrementally extendable telescopic mounting according to claim 1 wherein the guide lug defines a chamfered end.

5. An incrementally extendable telescopic mounting according to claim 1 wherein the first cylindrical part includes a second end part, the second end part defining a vertically projecting arc element, providing an additional contact surface with the second cylindrical part.

6. An incrementally extendable telescopic mounting according to claim 5 wherein the second cylindrical part includes a second end part, the second end part defining an arc element configured to abut the arc element of the first cylindrical part.

7. An incrementally extendable telescopic mounting according to claim 1 wherein an additional contact surface is provided, that is made up of a mobile cylindrical arc extension element, fastened in a sliding manner to the upper telescopic element, so as to create a partial or circular temporary extension of the upper telescopic element, resting totally or partially upon the inside wall of the other telescopic element, during the device extension/compression cycle.

8. An incrementally extendable telescopic mounting according to claim 7, characterized in that the mobile, sliding, cylindrical arc shaped extension element has the same centre as, and a radius that is intermediate to those of, the male and female element cylinders, has a thickness equal to that of the rib relief defining the cam-type guiding system laid out on the periphery of one of the telescopic elements, so as to slide vertically between the external surface of the male telescopic element and the inside wall of the female telescopic element and in that it is kept attached to the male element cylinder.

9. An incrementally extendable telescopic mounting according to claims 7 or 8, characterized in that the mobile, sliding, cylindrical arc shaped extension element travel length is determined
by the shortest length of an oblong hole laid out on the male telescopic element and, by the travel of a projecting element, attached to, and perpendicular to, the male telescopic element axis, which, by sliding within the oblong hole, ensures the mobile junction, by an attachment, for instance by clipsing, between the male telescopic element and the sliding, cylindrical arc shaped extension element, internal, the one and the other, to the female telescopic element.

10. An incrementally extendable telescopic mounting according to claim 7, characterized in that the sliding, cylindrical arc shaped extension element incorporates, on its upper part, a generatrix oriented housing, the upper ending of which slides along a vertical guiding rib projecting from the male part, and in that a spring under compression, forming a planar zigzag connected with the open housing bottom end, e.g. cast in one piece with said open housing bottom end, rests, at its upper end, on the ending of the vertical rib.

11. An incrementally extendable telescopic mounting according to claim 1 wherein there is a clearance between the second stop and the second wall.

12. An incrementally extendable telescopic mounting according to claim 1 wherein the first cylindrical part further includes
a plurality of first stops arranged around the longitudinal axis, and projecting from the first end part in a direction parallel to the longitudinal axis, each of the first stops defining a bearing surface having a respective distance from the circle,
wherein
the guide lug is displaceable in the groove whereby the second stop is positioned to selectively abut the bearing surface of one of the plurality of first stops.

* * * * *